United States Patent [19]

Black

[11] Patent Number: 4,462,138

[45] Date of Patent: Jul. 31, 1984

[54] WHEEL BRACKET ASSEMBLY HAVING A RESILIENT ELEMENT WITH PROGRESSIVELY INCREASING RESISTANCE

[75] Inventor: John W. Black, Hickory Corners, Mich.

[73] Assignee: Pemco-Kalamazoo, Inc., Kalamazoo, Mich.

[21] Appl. No.: 531,575

[22] Filed: Sep. 12, 1983

Related U.S. Application Data

[63] Continuation of Ser. No. 260,509, May 4, 1981, abandoned.

[51] Int. Cl.³ .......................................... B60B 33/00
[52] U.S. Cl. ................................. 16/44; 16/DIG. 36
[58] Field of Search ..................... 16/18 R, 21, 23, 28, 16/29, 35 D, 19, 32, 34, 44, DIG. 36

[56] References Cited

U.S. PATENT DOCUMENTS

| | | | |
|---|---|---|---|
| 1,745,992 | 2/1930 | Herold | 16/44 |
| 2,442,831 | 6/1948 | Suttles | 16/44 |
| 2,472,686 | 6/1949 | Snyder | 16/44 |
| 2,830,545 | 4/1958 | Robinson et al. | 16/44 |
| 4,312,096 | 1/1982 | Schubert et al. | 16/44 |

FOREIGN PATENT DOCUMENTS

| | | | |
|---|---|---|---|
| 624904 | 8/1961 | Canada | 16/44 |
| 1219525 | 12/1959 | France . | |
| 2399328 | 3/1979 | France . | |
| 357523 | 11/1961 | Switzerland | 16/44 |
| 785295 | 10/1957 | United Kingdom | 16/44 |
| 860352 | 6/1958 | United Kingdom . | |
| 861382 | 7/1958 | United Kingdom . | |
| 936538 | 7/1961 | United Kingdom . | |

Primary Examiner—Fred Andrew Silverberg
Attorney, Agent, or Firm—Flynn, Thiel, Boutell & Tanis

[57] ABSTRACT

A wheel bracket assembly includes an upper bracket having two spaced downwardly extending side flanges and a wheel carrying bracket pivotally supported between the upper bracket side flanges for pivotal movement about an axis. The second bracket has a generally horizontal top plate with a transverse, upwardly facing, concave groove and has side flanges which extend downwardly from opposite sides of the top plate and are adapted to pivotally support a wheel therebetween. Pivotal movement of the wheel carrying bracket in one direction is resisted by a resilient element which has one end engaging the top plate at a location within the groove, which extends away from such location approximately along the path of movement of the location about the pivot axis, which tapers in thickness toward such end, which has a semicylindrical head at the opposite end, and which has a transverse groove on each side thereof adjacent the head. An omega-shaped clip securely grips around the head with its legs disposed in the transverse grooves, and has its ends securely supported on respective side flanges of the upper bracket. Progressive pivotal movement of the wheel carrying bracket is countered by progressively increasing resistance from the resilient element.

9 Claims, 5 Drawing Figures

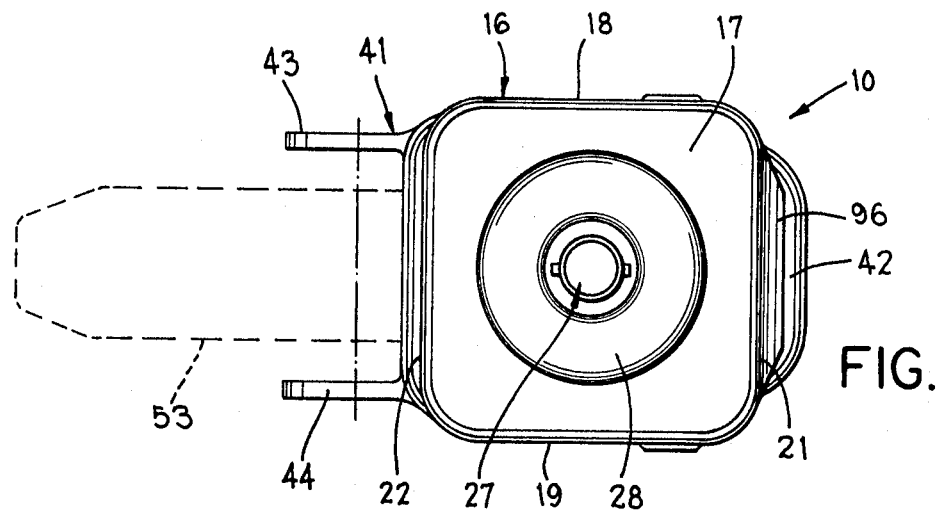
FIG. 3
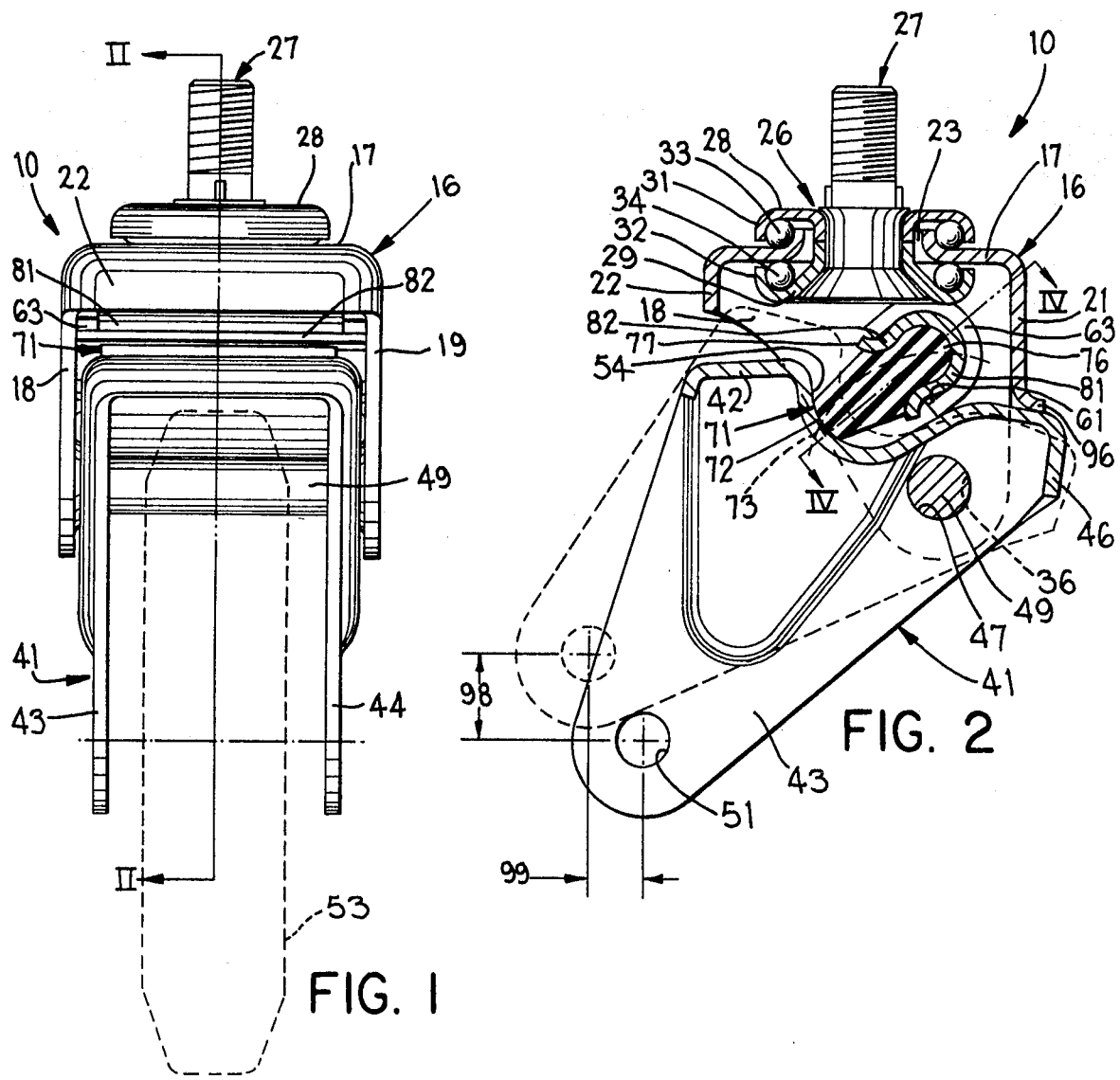
FIG. 1
FIG. 2

4,462,138

WHEEL BRACKET ASSEMBLY HAVING A RESILIENT ELEMENT WITH PROGRESSIVELY INCREASING RESISTANCE

This application is a continuation of U.S. Ser. No. 260,509 filed May 4, 1981, and now abandoned.

FIELD OF THE INVENTION

This invention relates to an improvement in a bracket for rotatably supporting a wheel and, more particularly, to a wheel bracket assembly which is adapted to resiliently absorb shocks and impacts applied to the wheel.

BACKGROUND OF THE INVENTION

Wheel carrying brackets are used in a variety of applications and are frequently subjected to punishing use. For example, wheel brackets used on shopping carts must support heavy loads of goods to be purchased, are repeatedly subjected to impacts and shocks from the curbs and rough pavement outside the store, and must endure extended exposure to rain, snow, sun and other elements. As a result, damage to the wheel, the wheel bearing and/or the bracket is common.

In order to reduce the damaging effect of such shocks, attempts have been made to incorporate a certain degree of resiliency into the wheel bracket assembly in order to damp or absorb the impact. Examples of such devices are disclosed in U.S. Pat. Nos. 1,745,992, 2,472,686 and 4,084,288. Although these devices have been adequate for their intended purposes, the character and performance of the resilient structure therein has not proved entirely satisfactory in all respects.

It is therefore an object of the present invention to provide an improved wheel bracket assembly which is adapted to resiliently absorb impacts and shocks applied thereto, is durable and is virtually maintenance-free.

A further object of the present invention is to provide a wheel bracket assembly, as aforesaid, which is self-leveling when moved over irregular surfaces but simultaneously provides a very stable support of the item it carries.

A further object of the present invention is to provide a wheel bracket assembly, as aforesaid, having a resilient structure which offers progressively increasing resistance to progressively greater shock abosrbing movement.

A further object of the present invention is to provide a wheel bracket assembly, as aforesaid, which is adapted to shield the resilient structure from the elements and from damage by foreign objects.

SUMMARY OF THE INVENTION

The objects and purposes of the invention, including those set forth above, are met by providing a wheel bracket assembly which includes an upper bracket with spaced, downwardly extending side flanges and a wheel carrying bracket pivotally supported between the side flanges of the upper bracket for movement about a substantially horizontal axis. The wheel carrying bracket has a generally horizontal top plate and spaced side flanges which extend downwardly from opposite edges of the top plate and are adapted to pivotally support a wheel therebetween. A resilient element has one end supported on the upper bracket at a location above the wheel carrying bracket, extends from such location toward the wheel carrying bracket, has its opposite end in engagement with the top plate of the wheel carrying bracket, and gradually tapers in thickness toward the end which engages the wheel carrying bracket. Progressive pivotal movement of the wheel carrying bracket toward the resilient element is countered by progressively increasing resistance from the resilient element.

In a preferred embodiment, the top plate of the wheel carrying bracket has a transverse, upwardly facing, concave groove and the resilient element engages the top plate within such groove. The resilient element extends away from the top plate approximately along the path of movement about the pivot axis of the surface area of the top plate engaged by the resilient element. The resilient element has a lateral width less than the lateral distance between the side flanges of the upper bracket, has a semicylindrical head at its end remote from the wheel carrying bracket, and has a concave transverse groove on each side adjacent the semicylindrical head. An omega-shaped clip securely grips around the head of the resilient element and its legs engage the transverse grooves in the resilient element. The clip extends between and has its ends supported on the respective side flanges of the upper bracket.

BRIEF DESCRIPTION OF THE DRAWINGS

Other objects, purposes and advantages of this invention will be apparent to persons acquainted with devices of this general type upon reading the following specification and inspecting the accompanying drawings, in which:

FIG. 1 is an end view of a wheel bracket embodying the present invention;

FIG. 2 is a sectional view taken along the line II—II of FIG. 1;

FIG. 3 is a top view of the wheel bracket of FIG. 1;

Figure 4:
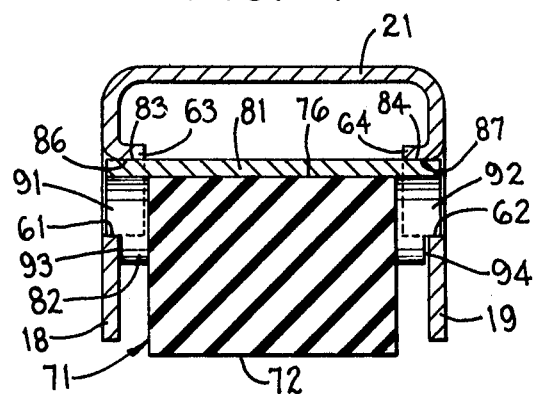
FIG. 4 is a sectional view taken along the line IV—IV of FIG. 2.

Certain terminology will be used in the following description for convenience in reference only and will not be limiting. The words "up" and "down" will designate directions in the drawings to which reference is made. The words "front" and "rear" will respectively refer to the right and left of the wheel bracket assembly as illustrated in FIG. 2. The words "in" and "out" will respectively refer to directions toward and away from the geometric center of the wheel bracket and designated parts thereof. Such terminology will include the words specifically mentioned, derivatives thereof and words of similar import.

DETAILED DESCRIPTION

Referring to FIGS. 1 and 2, a wheel bracket assembly 10 includes an upper bracket 16 having a substantially horizontal swivel plate 17, parallel side flanges 18 and 19 which extend downwardly from opposite lateral edges of the swivel plate 17, a front flange 21 which extends downwardly from the front edge of the swivel plate 17 and extends laterally between the side flanges 18 and 19, and a short rear flange 22 which extends downwardly from the rear edge of the swivel plate 17. A central vertical opening 23 is provided through the swivel plate 17 and the edges of the opening 23 are bent upwardly.

A swivel mechanism 26 for pivotally mounting the wheel bracket assembly 10 to an item to be supported is disposed in the opening 23. The swivel mechanism 26 is of conventional construction and is substantially identical to that disclosed in detail in U.S. Pat. Nos. 3,142,085 or 4,219,903, both of which are assigned to the assignee of the present invention. The disclosure of the swivel mechanisms in these two patents is incorporated herein by reference. Accordingly, the swivel mechanism 26 is not described here in detail, although a brief description is given for convenience.

The swivel mechanism 26 has an upright, threaded kingpin 27 which is coaxially and rotatably disposed within the central opening 23 and has a diameter less than that of the central opening 23. More specifically, the kingpin 27 has a pair of radially outwardly extending bearing ball retainers 28 and 29 nonrotatably secured thereto. The retainer 28 is located above the swivel plate 17 and the retainer 29 is located below the swivel plate 17. The respective ends 31 and 32 of the retainers 28 and 29 are bent toward each other so as to define facing concave bearing races. A plurality of bearing balls 33 are disposed between the upturned edge of the central opening 23 and the race on the upper retainer 28. A plurality of bearing balls 34 are disposed in the upwardly facing concave race on the lower retainer 29 and engage the underside of the swivel plate 17.

Each of the side flanges 18 and 19 of the upper bracket 16 has an opening 36 adjacent its lower end, only the opening 36 (FIG. 2) in flange 18 being illustrated in the drawings, which openings are forward of the axis of the kingpin 27, are coaxially aligned and are used for a purpose described hereinafter.

A wheel carrying bracket 41 has a generally horizontal top plate 42 and two parallel side flanges 43 and 44 which extend downwardly from opposite sides of the top plate 42. A short front flange 46 extends downwardly from the forward end of the top plate 42 and interconnects the front part of the upper parts of each of the flanges 43 and 44. Each side flange 43 and 44 has an opening 47 in its upward forward portion, only the opening 47 (FIG. 2) in flange 43 being illustrated in the drawings, which openings are coaxially aligned. The wheel carrying bracket 41 is disposed between the side flanges 18 and 19 of the upper bracket 16 with the openings 47 coaxially aligned with the openings 36 in the upper bracket, and a substantially horizontal axle 49 securely mounted in the opening 36 extends through the openings 47, thereby supporting the wheel carrying bracket for pivotal movement with respect to the upper bracket.

Each of the side flanges 43 and 44 of the wheel carrying bracket 41 has an opening 51 adjacent its lower end, which openings 51 are coaxially aligned and are adapted to support the axle of a wheel 53 carried by the wheel bracket assembly 10. The wheel 53 may be of any conventional type, does not form a part of the present invention, and is therefore illustrated only with broken lines.

The top plate 42 of the wheel carrying bracket 41 has a transverse, upwardly facing, concave groove 54. Each side flange 18 and 19 of the upper bracket 16 has, slightly above the respective opening 36 or 37 therein, a respective opening 61 and 62 therethrough of substantially semicircular shape. The openings 61 and 62 are aligned with each other and each has, along its arcuate edge, a respective inwardly extending arcuate flange 63 and 64 (FIG. 4).

Figure 5:
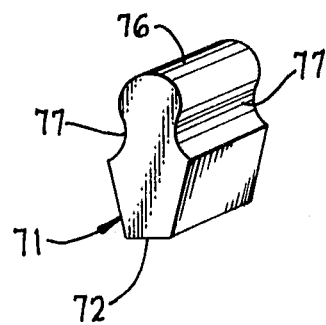
FIG. 5 is a perspective view of a resilient element which is a component of the wheel bracket of FIG. 1.

A resilient element 71 (FIGS. 2, 4 and 5) is disposed between the side flanges 18 and 19 of the upper bracket 16 and between the swivel plate 17 of the upper bracket 16 and the top plate 42 of the wheel carrying bracket 41. The width of the resilient element 71 is less than the distance between the side flanges 17 and 18. The resilient element 71 has one end 72 in engagement with the upper surface of the top plate 42 at a location within the transverse groove 54. The resilient element 71 extends away from the top plate 42 approximately along the theoretical path of movement 73 around the axle 49 of the area of the top plate 42 which is engaged by the end 72 of the resilient element 71. This path of movement 73 lies along a circle concentric with the axle 49. The resilient element 71 has a transversely extending semicylindrical head 76 at its end remote from the end 72, and on each side has a transverse concave groove 77 adjacent the semicylindrical head 76, the shortest distance between the concave grooves 77 being less than the diameter of the semicylindrical head 76. The resilient element 71 has its maximum thickness at a location intermediate its ends and adjacent the grooves 77, and tapers gradually and uniformly in thickness therefrom toward end 72.

An elongated C-shaped or omega-shaped clip 81 securely grips around the semicylindrical head 76 of the resilient element 71 and the legs 82 of the clip 81 engage the grooves 77 on the resilient element 71. The general contour of the clip 81 is such that the entire inner surface of the clip 81 is in engagement with the surfaces of the head 76 and grooves 77 of the resilient element 71. This may be effected by forming the clip 81 to the desired shape prior to assembly, or by bending the clip 81 to its final shape as it is mounted on the head 76 of the resilient element 71 during assembly. In either case, the clip 81 preferably grips the resilient element 71 relatively tightly, and may even compress the resilient element 71 slightly.

The radially outer surfaces 83 and 84 (FIG. 4) of the respective ends of the clip 81 are coaxial with and disposed against the respective radial inner surfaces of arcuate flanges 63 and 64 on side flanges 18 and 19 of the upper bracket 16. Each end of the clip 81 has a respective semicircular extension 91 and 92 which extends into a respective one of the semicircular openings 61 and 62 in the side flanges 18 and 19, the semicircular shape of the extensions 91 and 92 cooperating with the semicircular shape of the openings 61 and 62 to limit rotation of the clip 81 and resilient element 71 with respect to the upper bracket 16 about a horizontal axis. Rotation of the clip 81 is also limited by engagement of the legs 82 of the clip with the ends of the arcuate flanges 63 and 64. At each end of each extension 91 and 92 the clip 81 has respective outwardly facing shoulders 93 and 94 which engage the inner surfaces of the side flanges 18 and 19 to resist lateral movement of the clip 81 with respect to the upper bracket 16.

The lower end 96 (FIG. 2) of the front flange 21 of the upper bracket 16 engages the forward portion of the top plate 42 of the wheel carrying bracket 41 to limit pivotal movement of the wheel carrying bracket 41 in a direction away from the resilient element 71.

The resilient element 71 can be made from a number of suitable materials, but is preferably made from a polyurethane having a hardness in the range of 75 Shore A to 55 Shore D durometer. In practice, a hardness of 80 Shore A durometer has proved satisfactory for most applications, with minor variations in the relative dimensions of the resilient element 71 being utilized to achieve desired performance characteristics for particular applications.

OPERATION

Although the operation of the wheel bracket assembly described above will be understood from the foregoing description by persons skilled in the art, a summary of such operation is now given for convenience.

In normal use, the weight of the supported item will cause the wheel carrying bracket 41 to pivot slightly about the axis 49 and compress slightly the resilient element 71, so that the item is resiliently supported at all times. If, as the item is being moved, an irregularity in the floor or an obstruction is encountered by the wheel 53, the wheel carrying bracket 41 will pivot further about the axle 49, for example, from the position shown in solid lines in FIG. 2 to the position shown in broken lines in FIG. 2. The position of the axle 49 with respect to the axle of the wheel 53 is such that a relatively large vertical movement 98 (FIG. 2) of the wheel 53 is possible as it negotiates the obstacle without a substantial horizontal displacement 99.

The shape and composition of the resilient element 71 is such that it offers progressively increasing resistnce to progressively further pivotal movement of the wheel carrying bracket 41 about the axis 49.

the swivel plate 17, side flanges 18 and 19, front flange 21 and rear flange 22 of the upper bracket 16 form a housing which substantially surrounds the resilient element 71 and protects it from exposure to the elements and from damaging contact with foreign objects.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A wheel bracket assembly, comprising a first bracket having spaced, downwardly extending first side flanges; a second bracket having a top member and spaced second flanges extending downwardly from opposite sides of said top member, said second bracket being disposed between said first side flanges and pivotally supported on said first bracket for movement about a substantially horizontal pivot axis, said second side flanges having means facilitating rotatable support of a wheel therebetween; and resilient means for yieldably resisting pivotal movement of said second bracket in one direction about said pivot axis, said resilient means including a resilient element having a first end supported by said first bracket at a location above said top member of said second bracket and having a second end opposite said first end engaging said top member of said second bracket, a portion of said resilient element adjacent said second end increasing gradually in thickness toward said first end; wherein said resilient element extends away from said top member approximately along a path of movement about said pivot axis of a surface area of said top member which is engaged by said second end of said resilient element; wherein said top member has a transverse, upwardly facing concave groove; wherein said resilient element has a width which engaging said top member within said transverse groove; where said resilient element has a width which is less than the distance between said first side flanges; wherein said first end of said resilient element is a transversely extending semicylindrical head; wherein said resilient element has a transversely extending concave groove on each side thereof adjacent said head; and wherein said first bracket includes an omega-shaped clip extending between said first side flanges and support means on said first side flanges cooperable with respective ends of said clip for securely supporting said clip thereon, said clip securely gripping around said head of said resilient element and each leg of said clip engaging a respective said transverse groove in said resilient element.

2. The wheel bracket assembly of claim 1, wherein said support means on said first bracket includes in each said first side flange a substantially semicircular opening and includes an inwardly extending annular flange along an arcuate edge of each said semicircular opening, a radially outer surface of each end of said clip being disposed against a radially inner surface of a respective said arcuate flange, and wherein said clip has a substantially semicircular extension at each end which extends into a respective said semicircular opening and has shoulder means adjacent each said extension which engages an inner surface of a respective said first side flange for resisting transverse movement of said clip relative to said first bracket.

3. A wheel bracket assembly, comprising a first bracket having spaced, downwardly extending first side flanges; a second bracket having a top member and spaced second flanges extending downwardly from opposite sides of said top member, said second bracket being disposed between said first side flanges and being pivotally supported on said first bracket for movement about a substantially horizontal pivot axis, said second side flanges having means facilitating rotatable support of a wheel therebetween, and resilient means for yieldably resisting pivotal movement of said second bracket in one direction about said pivot axis, said resilient means including a resilient element having a first end supported by said first bracket at a location above said top member of said second bracket and having a second end opposite said first end which engages said top member of said second bracket, a portion of said resilient element adjacent said second end increasing gradually in thickness toward said first end; wherein said first end of said resilient element is a transversely extendng semicylindrical head; wherein said resilient element has a transversely extending concave groove on each side thereof adjacent said head; and wherein said first bracket includes an omega-shaped clip extending between said first side flanges, and support means on said first side flanges cooperable with respective ends of said clip for securely supporting said clip thereon, said clip securely gripping around said head of said resilient element and each leg of said clip engaging a respective said transverse groove in said resilient element.

4. The wheel bracket assembly of claim 3, wherein said resilient means is adapted to offer progressively increasing resistance to pivotal movement of said second bracket as said second bracket pivots progressively farther in said one direction.

5. The wheel bracket assembly of claim 3, wherein said resilient element extends away from said top member approximately along a path of movement about said pivot axis of a surface area of said top member which is engaged by said second end of said resilient element.

6. The wheel bracket assembly of claim 5, wherein said top member has a transverse, upwardly facing concave groove therein, and wherein said second end of said resilient element engages said top member within said transverse groove.

7. The wheel bracket assembly of claim 3, wherein said resilient element is made of polyurethane having a hardness in the range of 75 Shore A to 55 Shore D Durometer.

8. The wheel bracket assembly of claim 3, wherein said first bracket includes stop means cooperable with said second bracket for limiting pivotal movement of said second bracket about said pivot axis in a direction opposite said one direction.

9. A wheel bracket assembly, comprising: a first bracket having spaced, downwardly extending first side flanges; a second bracket having a top member and spaced second flanges extending downwardly from opposite sides of said top member, said second bracket being disposed between said first side flanges and being pivotally supported on said first bracket for movement about a substantially horizontal pivot axis, said second side flanges having means for facilitating rotatable support of a wheel therebetween; resilient means for yieldably resisting pivotal movement of said second bracket in one direction about said pivot axis, said resilient means including a resilient element having first and second ends, said resilient element having a transversely extending semicylindrical head at said first end thereof, having a transversely extending concave groove on each side thereof adjacent said head, and decreasing progressively in thickness from said concave grooves to said second end thereof; and approximately C-shaped clip means fixedly supported on said first bracket, said clip means securely gripping around said head of said resilient element and having legs which engage said transverse grooves in said resilient element, said second end of said resilient element being disposed against a surface of said top member of said second bracket.

* * * * *

UNITED STATES PATENT AND TRADEMARK OFFICE
CERTIFICATE OF CORRECTION

PATENT NO. : 4 462 138
DATED : July 31, 1984
INVENTOR(S) : John W. Black

It is certified that error appears in the above-identified patent and that said Letters Patent is hereby corrected as shown below:

Col. 5, line 25; change "the" to ---The---.

line 64; delete in its entirety and replace with the following: ---groove therein, said second end of said resilient element---.

line 66; change "where" to ---wherein---.

Col. 6, line 15; change "annular" to ---arcuate---.

line 35; change the comma to a semicolon.

Signed and Sealed this

Fifth Day of March 1985

[SEAL]

Attest:

DONALD J. QUIGG

Attesting Officer

Acting Commissioner of Patents and Trademarks